United States Patent
Chen

(10) Patent No.: US 7,535,139 B2
(45) Date of Patent: May 19, 2009

(54) BI-DIRECTIONAL REVERSIBLE SUBMERSIBLE MOTOR

(76) Inventor: Chi-Der Chen, 85-1, Shuiyuan Road, Taipei (TW)

( * ) Notice: Subject to any disclaimer, the term of this patent is extended or adjusted under 35 U.S.C. 154(b) by 417 days.

(21) Appl. No.: 11/527,350

(22) Filed: Sep. 26, 2006

(65) Prior Publication Data

US 2008/0073990 A1 Mar. 27, 2008

(51) Int. Cl.
*H02K 5/12* (2006.01)
*H02K 47/00* (2006.01)
*F04B 17/00* (2006.01)

(52) U.S. Cl. ............... 310/87; 427/423.12; 427/423.3; 427/423.5

(58) Field of Classification Search ............ 310/87, 310/89; 417/410.3, 423.12–423.15, 423.3, 417/423.5, 423.9, 366
See application file for complete search history.

(56) References Cited

U.S. PATENT DOCUMENTS

| 5,040,954 | A | * | 8/1991 | Iwai | 417/423.12 |
| 5,648,694 | A | * | 7/1997 | Kobayashi et al. | 310/87 |
| 5,997,261 | A | * | 12/1999 | Kershaw et al. | 417/366 |
| 6,174,143 | B1 | * | 1/2001 | Horski et al. | 417/366 |
| 7,226,277 | B2 | * | 6/2007 | Dooley | 417/356 |
| 2004/0234395 | A1 | * | 11/2004 | Hatano | 417/420 |
| 2005/0019184 | A1 | * | 1/2005 | Geisinger et al. | 417/423.3 |

* cited by examiner

*Primary Examiner*—Tran N Nguyen
(74) *Attorney, Agent, or Firm*—Pro-Techtor Int'l Services

(57) ABSTRACT

A bi-directional reversible submersible motor, which includes a housing having an inside bracket, two water guide plates fastened to the two distal ends of the housing and covered with a respective cap, a locating rod connected between the water guide plates, a sleeve affixed to the bracket and holding a winding, a magnetic shaft and fan blade assembly rotatably supported on the locating rod in the sleeve for rotating two fan blades to pump water when the winding is electrically energized, and a controller for controlling the supply of electric current to the winding to control the direction and time of rotation of the fan blades.

6 Claims, 8 Drawing Sheets

BI-DIRECTIONAL REVERSIBLE SUBMERSIBLE MOTOR

BACKGROUND OF THE INVENTION

1. Field of the Invention

The present invention relates to a submersible motor and more particularly, to a high-speed, high-capacity, bi-directional reversible submersible motor that is small-sized and does not cause significant vibration during operation.

2. Description of the Related Art

FIG. 1 shows a submersible motor for use in an aquarium. According to this design, the submersible motor comprises a housing 1. The housing 1 has a cylindrical chamber 11. A winding 14 is mounted inside the housing 1 around the chamber 11. A shaft 12 is inserted into the cylindrical chamber 11, having a vane wheel 13 provided at the front side thereof and suspending outside the housing 1 and a magnet 15 provided at the rear side thereof. When electric current is connected to the winding 14, the magnet 15 is induced to rotate, thereby causing the vane wheel to pump water. This design of submersible motor consumes much electric energy, and causes a high noise during operation. Further, the design of submersible motor pumps water in one single direction only.

SUMMARY OF THE INVENTION

The present invention has been accomplished under the circumstances in view. It is the main object of the present invention to provide a submersible motor, which is operable to selectively pump water between two reversed directions. It is another object of the present invention to provide a submersible motor, which saves consumption of electric power supply. It is still another object of the present invention to provide a submersible motor, which does not cause significant vibration or noise during operation.

To achieve these and other objects of the present invention, the bi-directional reversible submersible motor comprises a housing, which has a bracket on the inside of the hollow cylindrical body thereof and a plurality of mounting holes around the periphery of the two opposite open ends thereof; a sleeve, which is affixed to the bracket inside the housing, having a winding arranged around the inside wall thereof; a shaft and fan blade assembly, which comprises a tubular shaft inserted through the sleeve, a magnet affixed to and extending around the periphery of the tubular shaft and suspending in the sleeve, two fan blades respectively fastened to the two distal ends of the tubular shaft, and a locating rod inserted through the center of each of the fan blades and the tubular shaft; two water guide plates, which are respectively fastened to the two opposite open ends of the housing, each having a center through hole, which receives the locating rod; two caps respectively fastened to the mounting holes around the two opposite open ends of the housing and respectively covered on the water guide plates; two semispherical grilles, which are respectively fastened to the two opposite open ends of the housing and surrounding the caps, each having radial slots and a coupling groove around the periphery of one end thereof; two guards, each having a circular coupling portion respectively pivotally coupled to the coupling grooves of the semispherical grilles and a semispherical guard shell extended from the circular coupling portion; and a controller, which comprises a timer, a transformer, and a control knob.

DETAILED DESCRIPTION OF THE PREFERRED EMBODIMENT

Figure 1:
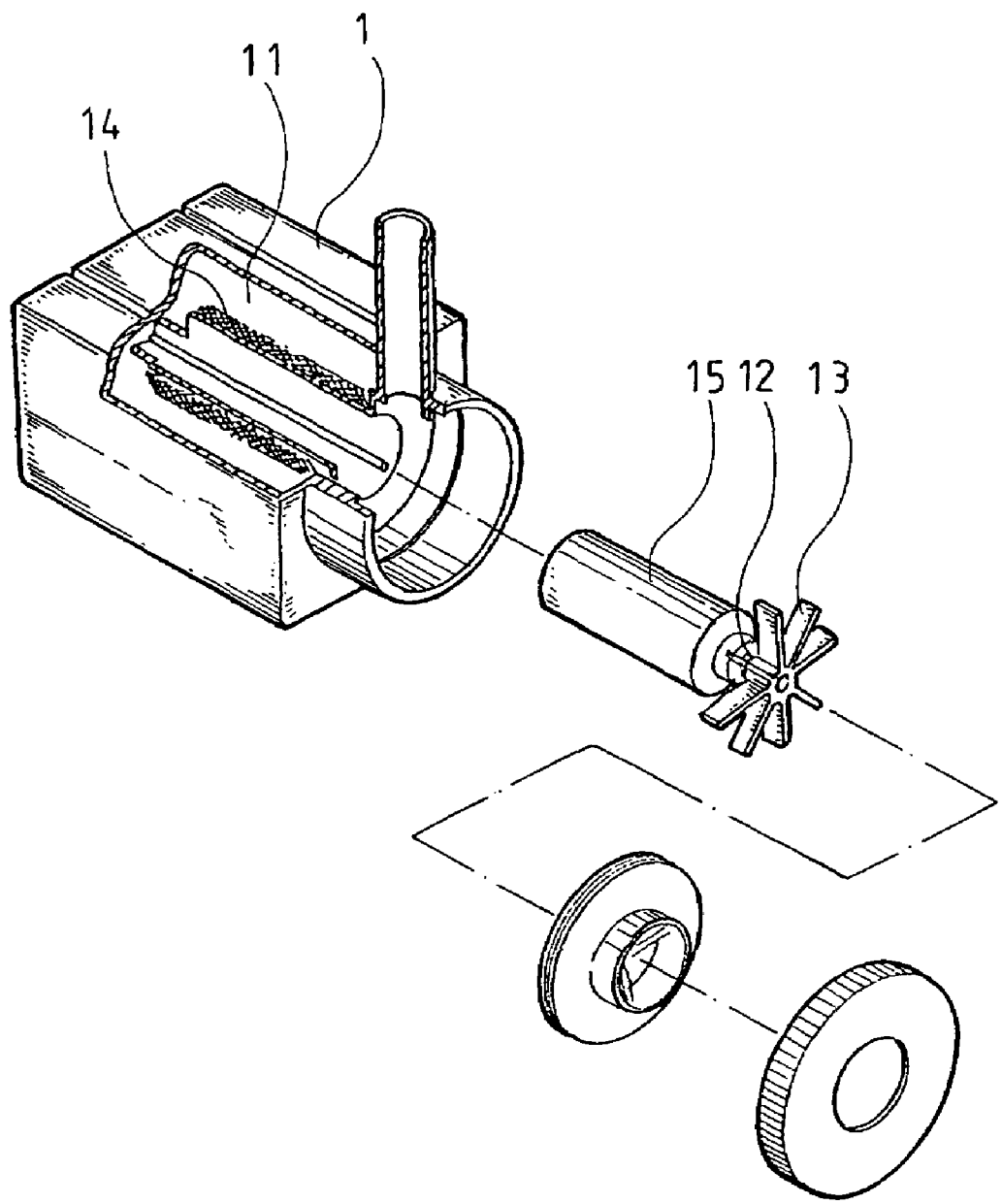
FIG. 1 is an exploded, partially cutaway view of a submersible motor according to the prior art.
Figure 2:
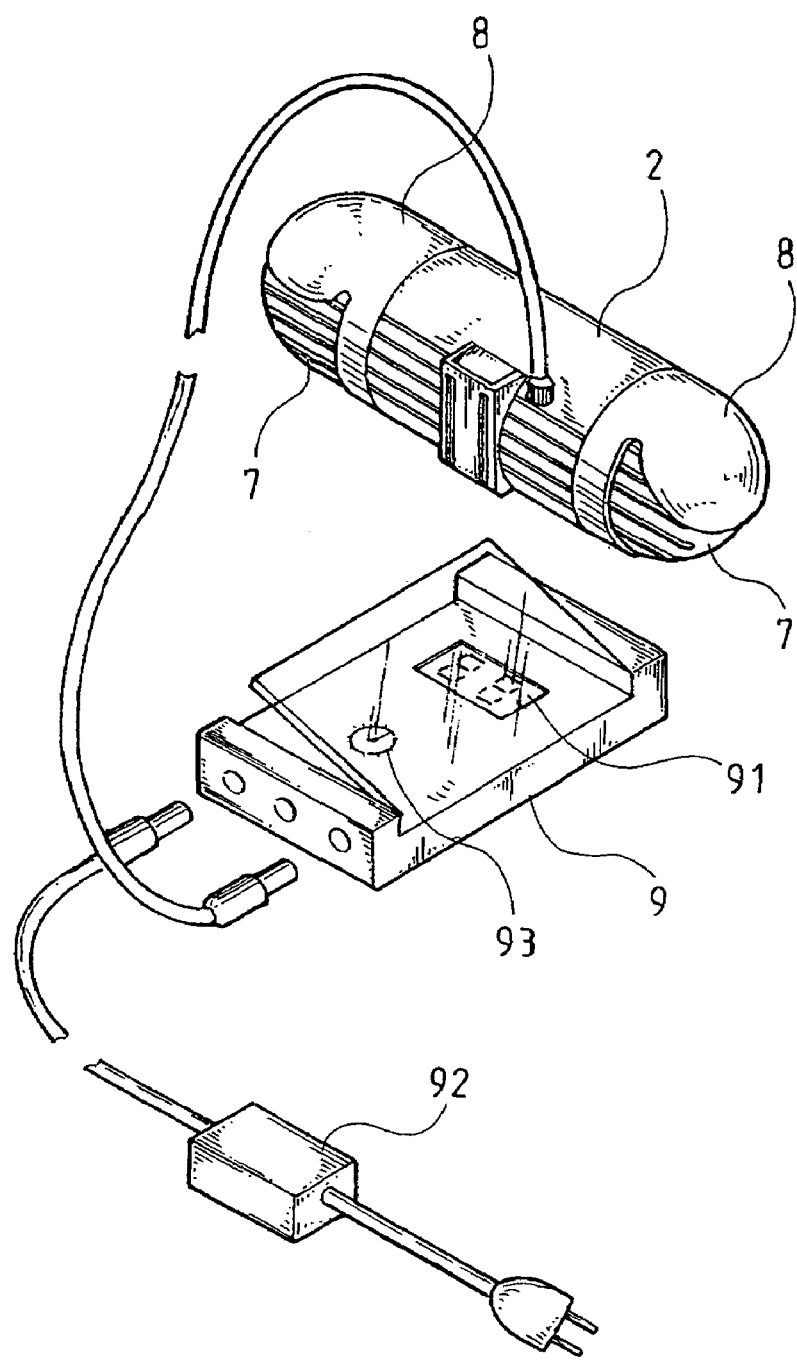
FIG. 2 is a perspective view of a bi-directional reversible submersible motor in accordance with a first embodiment of the present invention.
Figure 3:
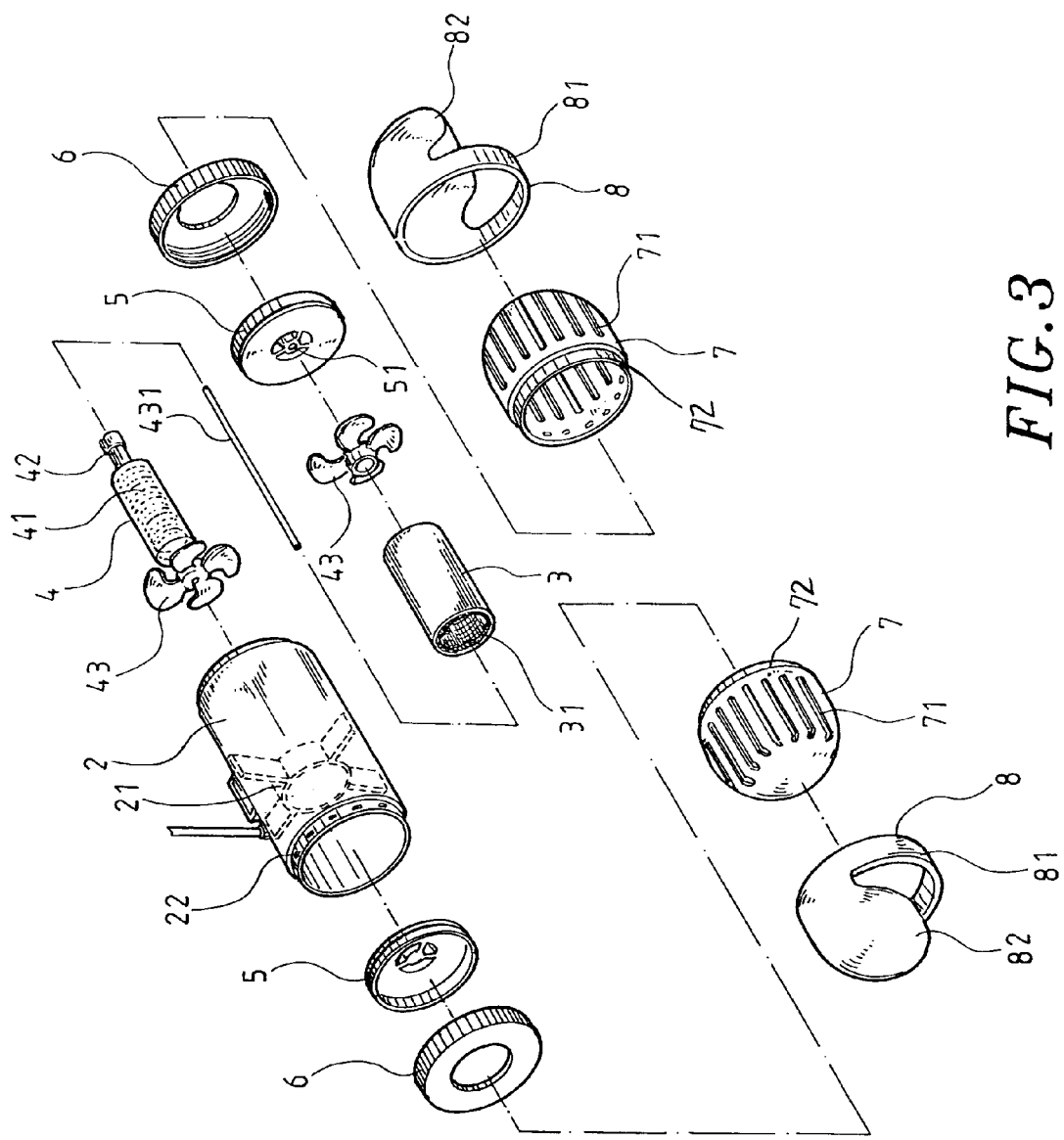
FIG. 3 is an exploded view of the bi-directional reversible submersible motor shown in FIG. 2 (the controller excluded).
Figure 4:
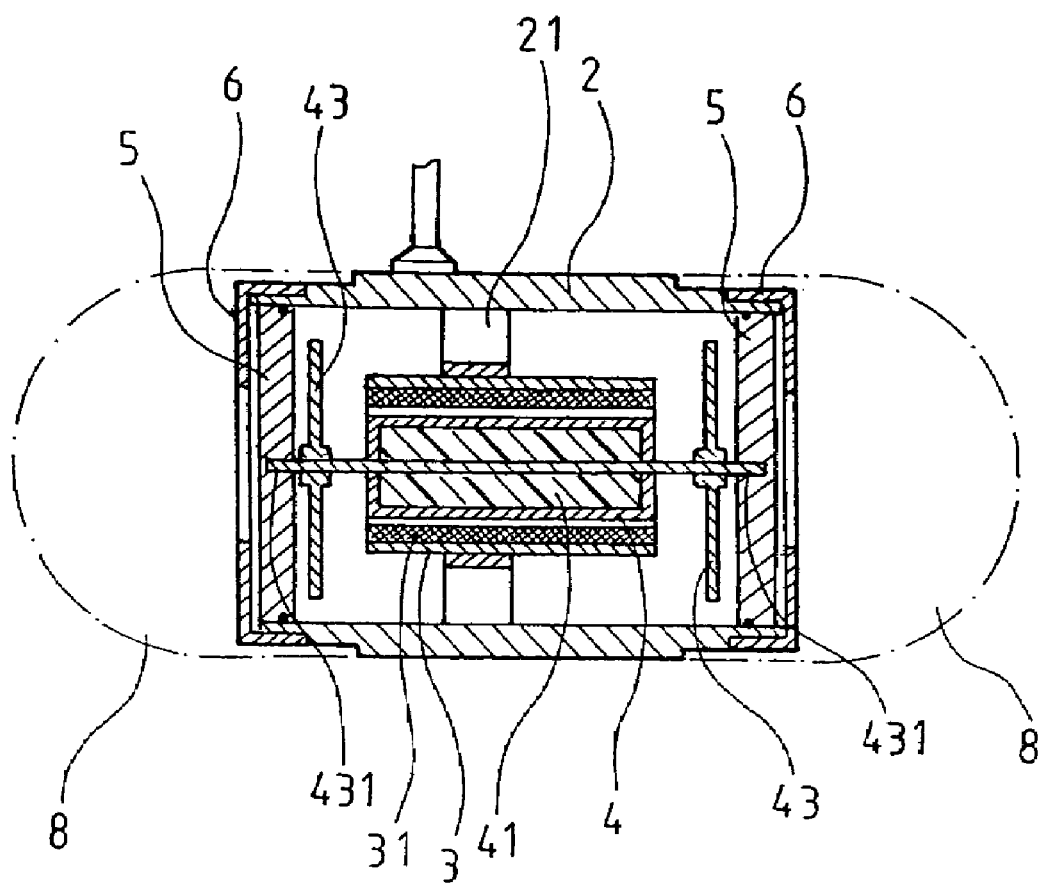
FIG. 4 is a sectional assembly view of the bi-directional reversible submersible motor in accordance with a first embodiment of the present invention.

Referring to FIGS. 2~4, a bi-directional reversible submersible motor in accordance with a first embodiment of the present invention is shown comprising:

a housing 2, which has a bracket 21 on the inside of the hollow cylindrical body thereof and a plurality of mounting holes 22 around the periphery of the two opposite open ends thereof;

a sleeve 3, which is affixed to the bracket 21 inside the housing 2, having a winding 31 arranged around the inside wall thereof;

a shaft and fan blade assembly 4, which comprises a tubular shaft 42 inserted through the sleeve 3, a magnet 41 affixed to and extending around the periphery of the tubular shaft 42 and suspending in the sleeve 3, two fan blades 43 respectively fastened to the two distal ends of the tubular shaft 42, and a locating rod 431 inserted through the center of each of the fan blades 43 and the tubular shaft 42;

two water guide plates 5, which are respectively fastened to the two opposite open ends of the housing 2, each having a center through hole 51, which receives the locating rod 431;

two caps 6 respectively fastened to the mounting holes 22 around the two opposite open ends of the housing 2 and respectively covered on the water guide plates 5;

two semispherical grilles 7, which are respectively fastened to the two opposite open ends of the housing 2 and surrounding the caps 6, each having radial slots 71 and a coupling groove 72 around the periphery of one end thereof;

two guards 8, each having a circular coupling portion 81 respectively pivotally coupled to the coupling grooves 72 of the semispherical grilles 7 and a semispherical guard shell 82 extended from the circular coupling portion 81; and a controller 9, which comprises a timer 91, a transformer 92, and a control knob 93.

When electric current is connected to the winding 31 in the sleeve 3, the magnet 41 is induced to rotate, causing rotation of the fan blades 43 with the tubular shaft 42 on the locating rod 431, thereby pumping water. The timer 91 of the controller 9 can be set to control the direction of rotation of the fan blades 43 with the tubular shaft 42 and the magnet 41. The guards 8 can be turned about the semispherical grilles 7 to the desired angle, thereby controlling the water input/output angle. Further, the user can operate the control knob 93 to regulate the pumping capacity.

Figure 5:
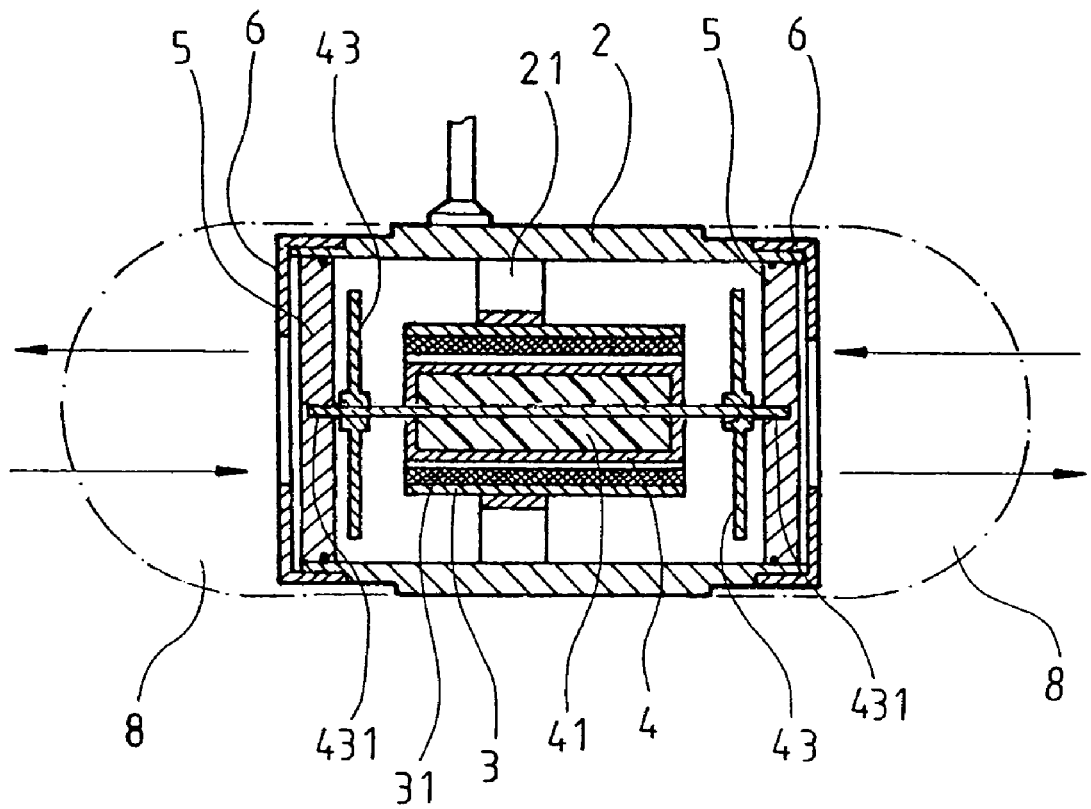
FIG. 5 is a schematic sectional view of the first embodiment of the present invention, showing an operation status of the bi-directional reversible submersible motor.

Referring to FIG. 5, during operation of the present invention, the winding 31 is electrically connected to induce the magnet 41, causing rotation of the tubular shaft 42 with the magnet 41, and therefore the fan blades 43 are rotated with the tubular shaft to pump water.

Figure 6:
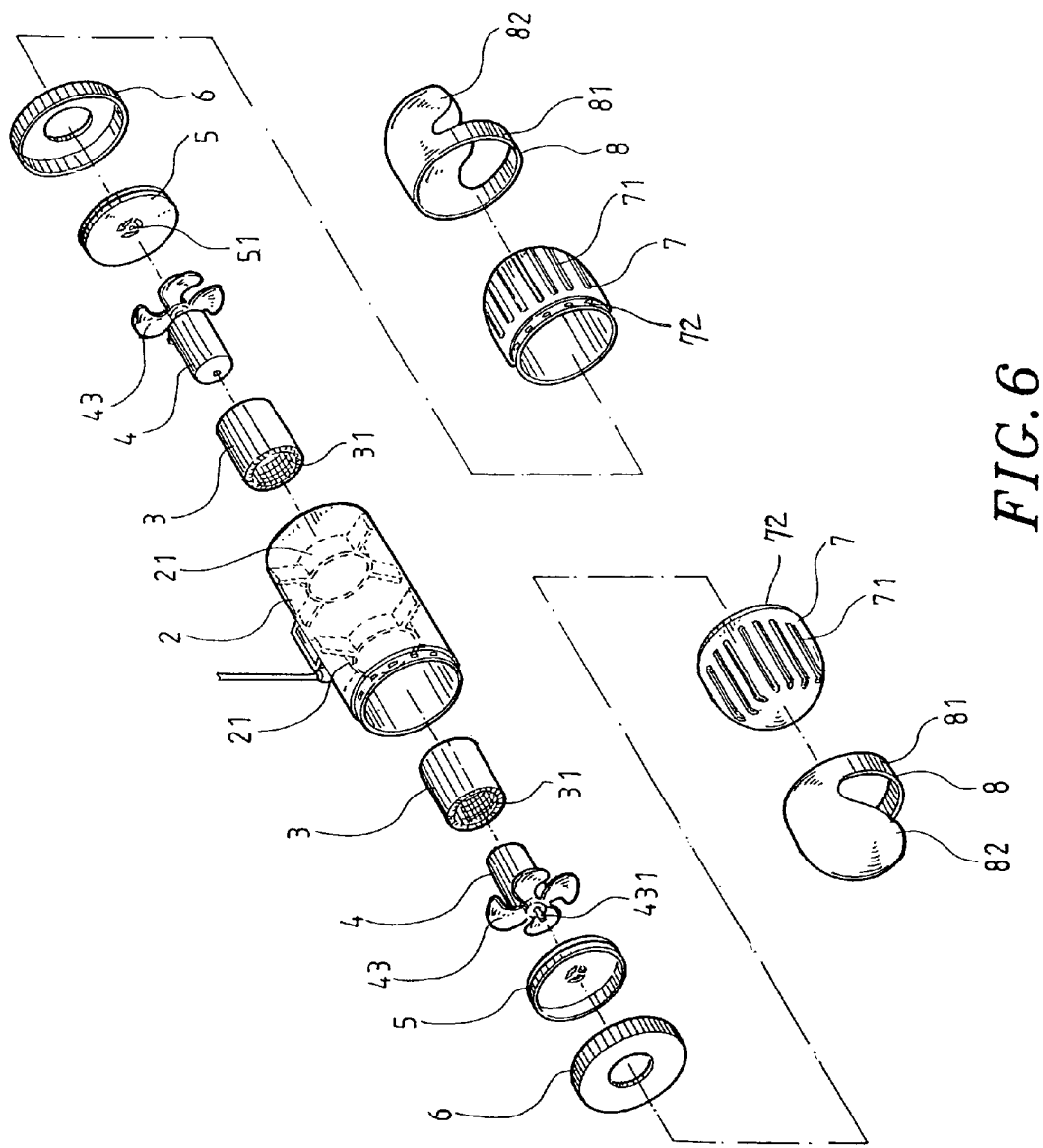
FIG. 6 is an exploded view of a bi-directional reversible submersible motor in accordance with a second embodiment of the present invention.
Figure 7:
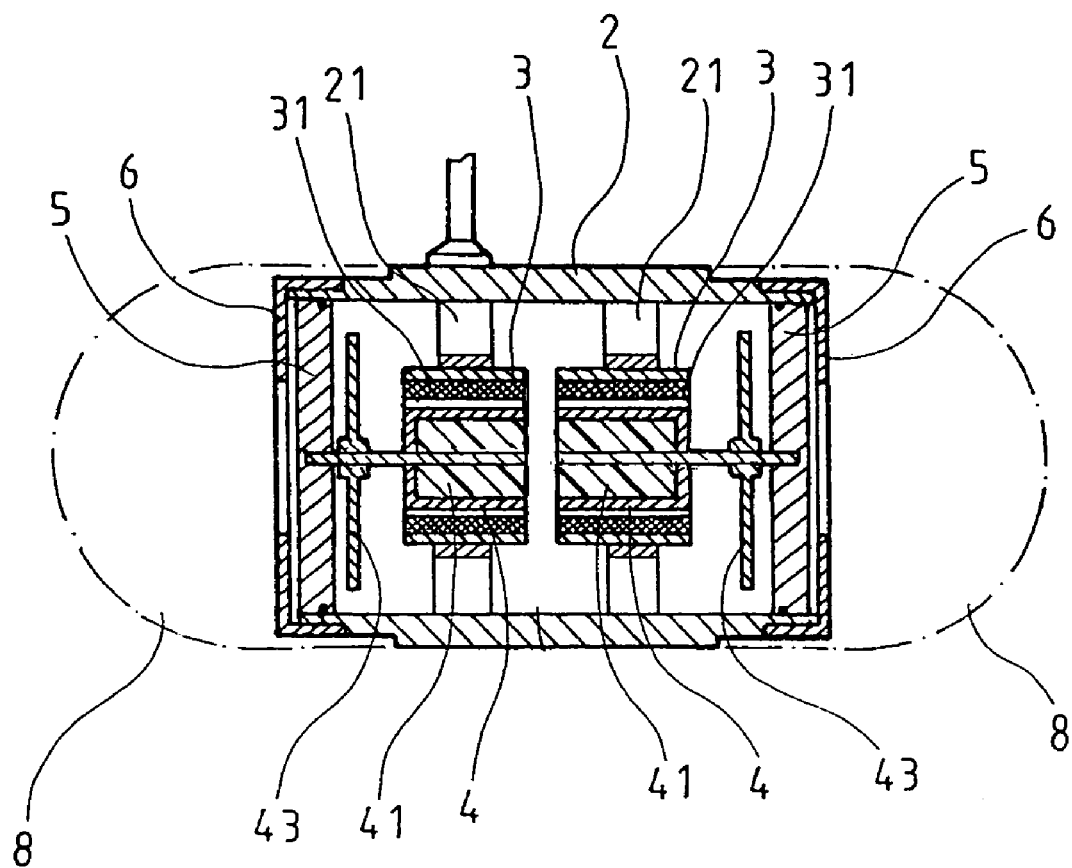
FIG. 7 is a sectional assembly view of the bi-directional reversible submersible motor in accordance with the second embodiment of the present invention.

FIGS. 6 and 7 show a bi-directional reversible submersible motor in accordance with a second embodiment of the present invention. According to this embodiment, the housing 2 comprises two brackets 21 arranged on the inside to support two sleeves 3 respectively, and two shaft and fan blade assembles 4 are respectively pivotally mounted in the sleeves 3. This embodiment achieves the same effect as the aforesaid first embodiment of the present invention shown in FIGS. 2~5.

Figure 8:
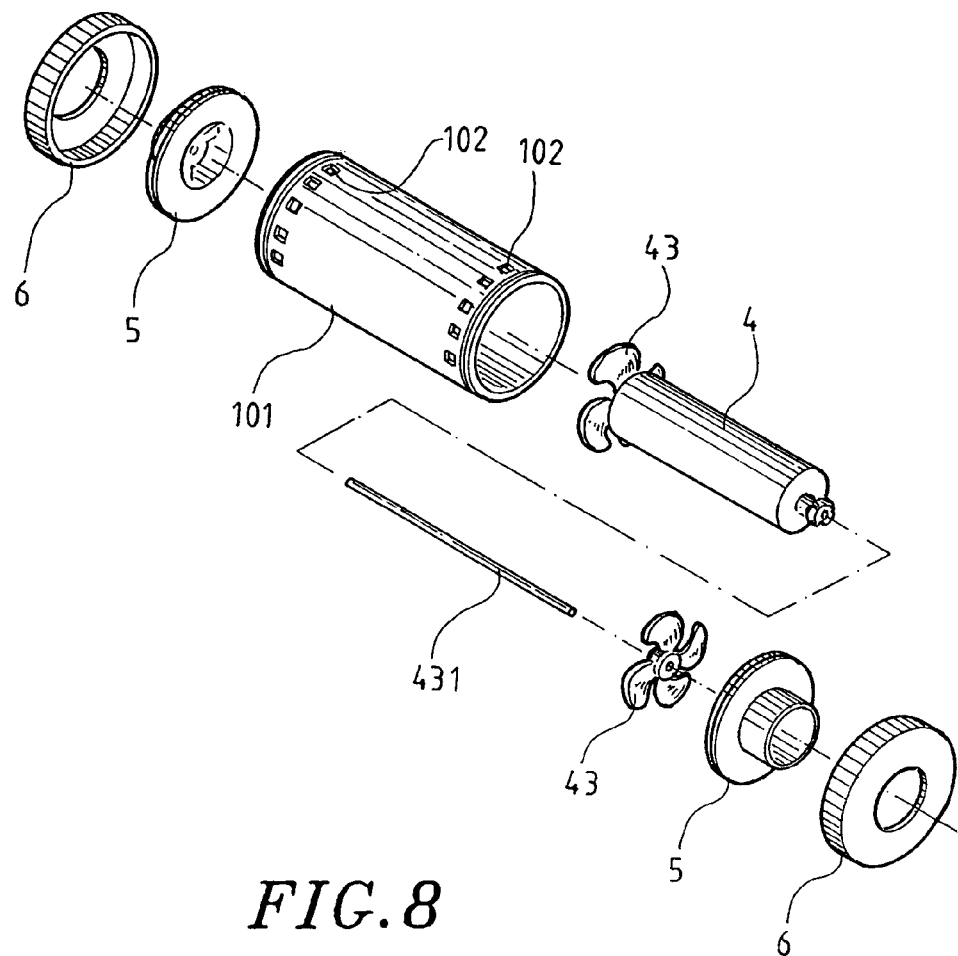
FIG. 8 is an exploded view of a bi-directional reversible submersible motor in accordance with a third embodiment of the present invention.
Figure 9:
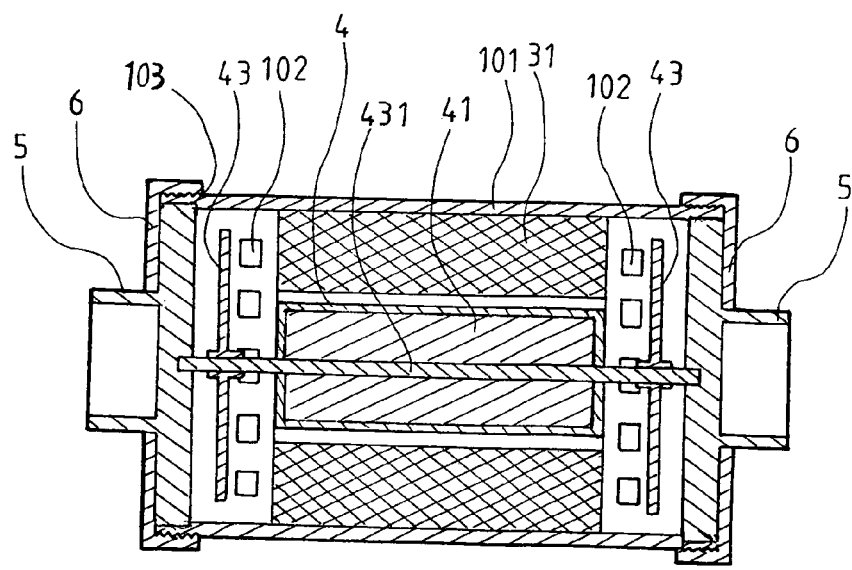
FIG. 9 is a sectional assembly view of the bi-directional reversible submersible motor in accordance with the third embodiment of the present invention.

FIGS. 8 and 9 show a bi-directional reversible submersible motor in accordance with a third embodiment of the present invention. According to this embodiment, the winding 31 is fixedly provided inside the cylindrical housing 101, and the magnetic shaft and fan blade assembly 4 is supported on a locating rod 431 inside the housing 101. The locating rod 431 is connected between two water guide plates 5 at the two distal open ends of the housing 101. Further, two caps 6 are respectively capped on the two distal open ends of the housing 101, and covered on the water guide plates 5. Further, the housing 101 has water inlets 102 on the periphery of each of the two distal open ends.

Although a particular embodiment of the invention has been described in detail for purposes of illustration, various modifications and enhancements may be made without departing from the spirit and scope of the invention.

What the invention claimed is:

1. A bi-directional reversible submersible motor comprising:
    a housing, said housing having at least one bracket fixedly mounted on an inside thereof and two opposite open ends;
    a sleeve affixed to said at least one bracket inside said housing, said sleeve holding a winding around an inside wall thereof;
    two water guide plates respectively fastened to the two opposite open ends of said housing, said water guide plates each having a center through hole;
    a shaft and fan blade assembly rotatably suspending in said sleeve, said shaft and fan blade assembly comprising a tubular shaft inserted through said sleeve, a magnet affixed to and extending around a periphery of said tubular shaft and suspending in said sleeve, and two fan blades respectively fastened to two distal ends of said tubular shaft;
    two caps respectively fastened to the two opposite open ends of said housing and respectively covered on said water guide plates;
    two semispherical grilles respectively fastened to the two opposite open ends of said housing and surrounding said caps, said semispherical grilles each having a plurality of radial slots and a coupling groove around the periphery of one end thereof; and
    two guards, said guards each having a circular coupling portion respectively pivotally coupled to the coupling grooves of said semispherical grilles and a semispherical guard shell extended from said circular coupling portion.

2. The bi-directional reversible submersible motor as claimed in claim 1, further comprising a locating rod inserted through said tubular shaft and a center through hole of each of said fan blades and fixedly connected between the center through holes of said water guide plates to support rotation of said shaft and fan blade assemblies.

3. The bi-directional reversible submersible motor as claimed in claim 1, wherein said housing comprises two brackets; said shaft and fan blade assembly is comprised of two symmetrical halves respectively supported in said brackets of said housing.

4. The bi-directional reversible submersible motor as claimed in claim 1, wherein said housing has a plurality of water inlets around the periphery of each of the two opposite open ends thereof.

5. The bi-directional reversible submersible motor as claimed in claim 1, wherein said housing has said winding arranged around an inside wall thereof adapted to act with the magnet of said shaft and fan blade assembly.

6. The bi-directional reversible submersible motor as claimed in claim 1, wherein said housing has mounting members arranged around the periphery of each of the two opposite open ends thereof for securing said caps.

\* \* \* \* \*